United States Patent [19]

Myskowski

[11] 3,980,105
[45] Sept. 14, 1976

[54] LAMINATED ARTICLE COMPRISING PYROLYTIC GRAPHITE AND A COMPOSITE SUBSTRATE THEREFOR

[75] Inventor: Edwin T. Myskowski, Culver City, Calif.

[73] Assignee: Hitco, Irvine, Calif.

[22] Filed: July 10, 1974

[21] Appl. No.: 487,051

[52] U.S. Cl. .............................. 138/140; 138/141; 239/265.11; 428/36; 428/217; 428/218; 428/304; 428/320; 428/408

[51] Int. Cl.² .................... F16L 9/14; B64D 33/04; B32B 9/00

[58] Field of Search .......... 138/140, 145, 146, 141; 161/7, 182, 271, 161, 166; 239/265.11, 265.15, DIG. 19; 117/46 CC, 46 CG; 428/307, 308, 310, 316, 408, 36, 217, 218, 304, 320

[56] References Cited
UNITED STATES PATENTS

| | | |
|---|---|---|
| 3,165,888 | 1/1965 | Keon .................. 117/46 CG X |
| 3,216,195 | 11/1965 | Keon .................. 117/46 CG X |
| 3,222,862 | 12/1965 | Sadownick ............. 239/265.11 |
| 3,576,700 | 4/1971 | Dell .................. 161/182 X |
| 3,647,511 | 3/1972 | Clark et al. ........... 117/46 CG |
| 3,673,051 | 6/1972 | Clark et al. .......... 117/46 CG X |
| 3,725,110 | 4/1973 | Rodgers et al. ........ 117/46 CG |
| 3,762,644 | 10/1973 | Mikeska ............... 239/265.11 |
| 3,853,586 | 12/1974 | Olcott ................ 239/265.11 |

*Primary Examiner*—Harold Ansher
*Assistant Examiner*—William R. Dixon, Jr.
*Attorney, Agent, or Firm*—Fraser and Bogucki

[57] ABSTRACT

A laminated article of hollow, circular shape includes an outer layer of relatively hard and strong carbonaceous material, an intermediate layer of highly deformable carbonaceous material disposed within the outer layer, and an inner layer of pyrolytic graphite deposited on the inner surface of the intermediate layer. The intermediate layer undergoes substantial compresssion with some permanent compaction thereof as the article cools following deposition of the pyrolytic graphite, due to the much greater shrinkage of the outer layer as compared with the layer of pyrolytic graphite. At the same time the intermediate layer has a desired amount of elasticity so as to exert nominal compressive stress on the layer of pyrolytic graphite. The intermediate layer may be comprised of porous carbon, and may have a surface thereof made very smooth in preparation for receipt of the pyrolytic graphite by infiltration, seal coating or other techniques.

5 Claims, 14 Drawing Figures

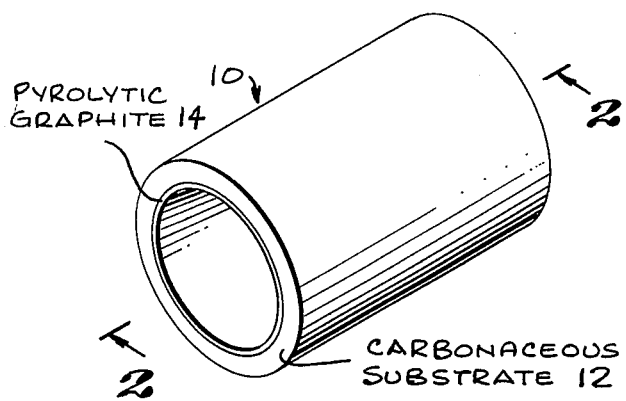
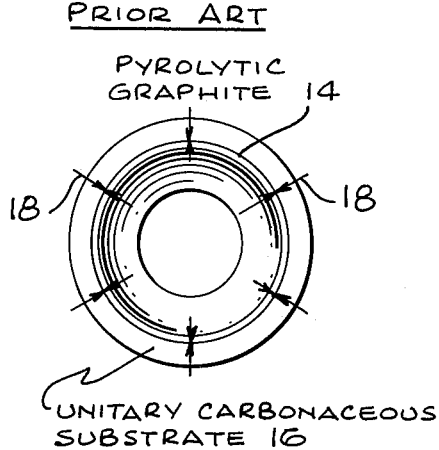
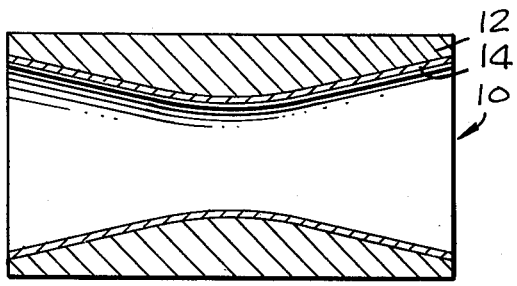
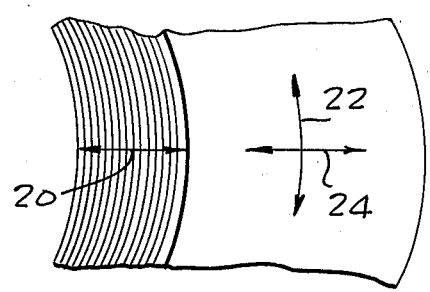
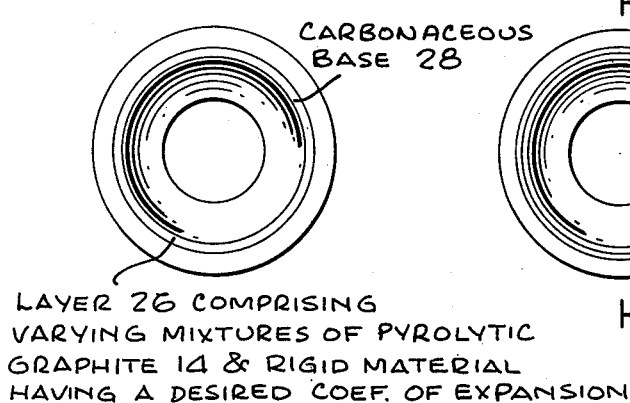
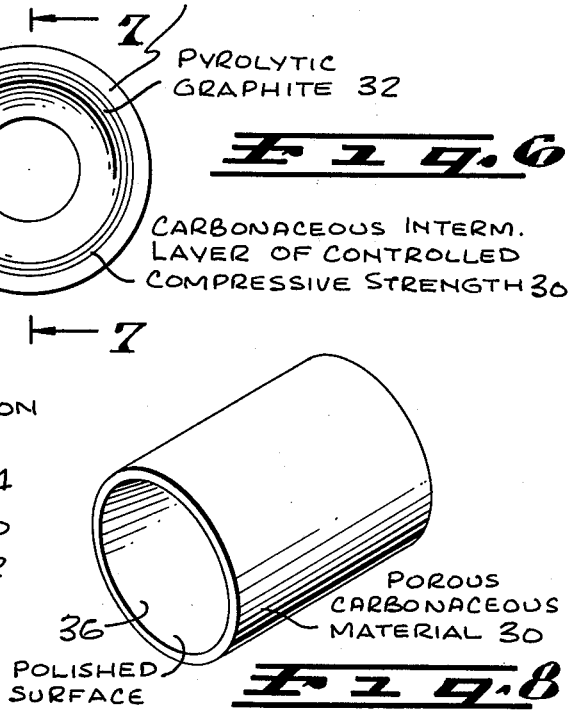

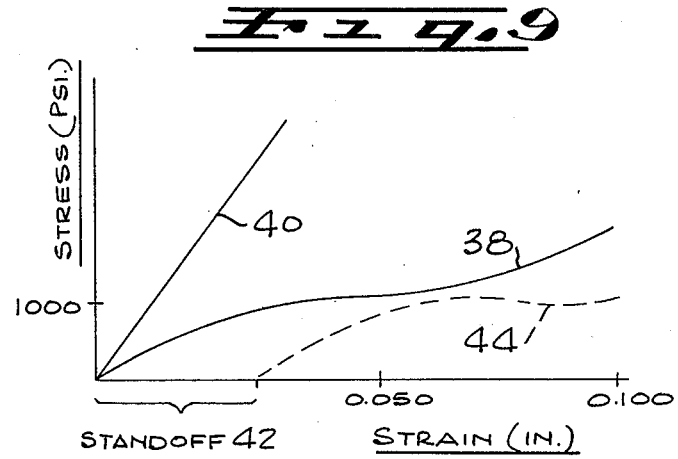
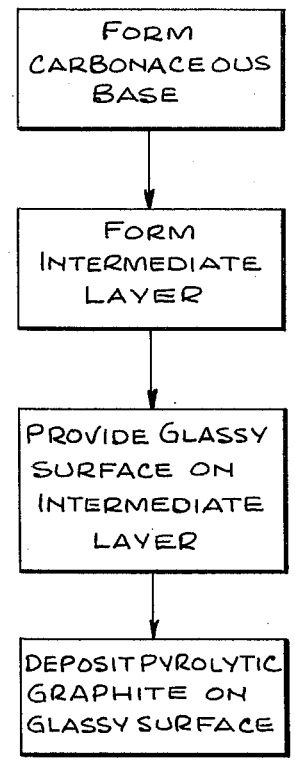
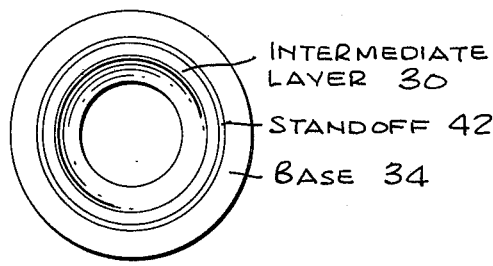
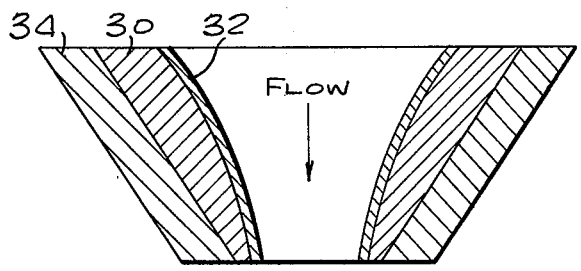
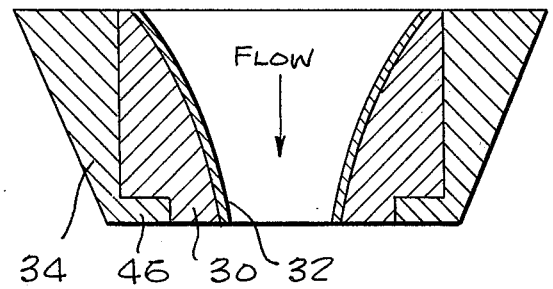
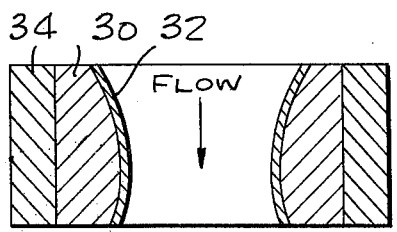

LAMINATED ARTICLE COMPRISING PYROLYTIC GRAPHITE AND A COMPOSITE SUBSTRATE THEREFOR

BACKGROUND OF THE INVENTION

1. Field of the Invention

The present invention relates to laminated articles of generaly carbonaceous composition, and more particularly to articles such as throat inserts for rocket motors in which pyrolytic graphite is deposited on a carbonaceous substrate.

2. History of the Prior Art

It is known to make throat inserts and other rocket motor components comprising pyrolytic graphite deposited on a substrate. The pyrolytic graphite in such structures forms an ablative and insulative layer capable of withstanding temperatures on the order of 6500°F. during operation of the rocket motor. The carbonaceous substrate provides a base or support for the otherwise fragile and brittle pyrolytic graphite.

Articles of this type are usually formed by heating the substrate to a relatively high temperature and depositing the pyrolytic graphite on the substrate using a hydrocarbon gas in the presence of the elevated temperature and a decreased pressure. Upon cooldown the substrate which is typically made of carbonaceous material such as graphite shrinks considerably more than the pyrolytic graphite due to substantial differences in their temperature coefficients of expansion. Due to the hollow, circular configuration of such articles in which the pyrolytic graphite forms a relatively thin layer on the inside of the substrate substantial stresses occur between the substrate and the pyrolytic graphite. These stresses which are often large enough to cause cracking of the substrate upon cooldown frequently result in delamination or other failure of the pyrolytic graphite during use of the article as a high temperature component within a rocket motor or similar device.

One approach in attempting to solve this problem involves codeposition of a rigid material with the pyrolytic graphite such that a layer is formed which varies from substantially pure pyrolytic graphite at the inner surface to the rigid material at the outer surface adjacent the substrate. The rigid material which typically comprises silicon carbide has a temperature coefficient of expansion between that of the pyrolytic graphite and that of the substrate. Consequently upon cooldown of the article following deposition of the pyrolytic graphite the rigid material shrinks more than the pyrolytic graphite but less than the substrate so as to interact with and diffuse the stresses imposed by both the pyrolytic graphite and the substrate.

While use of a rigid carbonaceous material with an intermediate temperature coefficient of expansion has met with some success for certain applications, such approach has a number of limitations making it unattractive in certain respects. For one thing the amount and temperature coefficient of expansion of the rigid material must be very carefully chosen to achieve desired results. This frequently means costly experimentation with various materials in order to determine a suitable material of correct size for a particular application. Moreover, even with careful selection of materials and other parameters, frequent failures may still result. Thus rigid, strong substrates may cause the pyrolytic graphite to break up or delaminate during cooldown without adversely affecting the substrate. Conversely, the use of weaker substrates may result in cracking of the substrates so as to ultimately result in failure of the article. Even those materials which may seem to be perfectly matched with the substrate and pyrolytic graphite may allow enough residual stress to remain in the substrate and the pyrolytic graphite so as to result in subsequent failure of the article during use.

BRIEF SUMMARY OF THE INVENTION

The present invention provides a laminated article in which the pyrolytic graphite is deposited on an intermediate layer of carbonaceous material having a high degree of compressibility and a selected amount of elasticity. The compressible material is chosen without regard for its temperature coefficient of expansion, and instead for its compressibility. The intermediate layer is disposed within an outer base of relatively strong carbonaceous material such as graphite, and pyrolytic graphite is deposited on an inner surface of the intermediate layer. During cooldown the substantially greater shrinkage of the base than of the pyrolytic graphite results in the intermediate layer being subjected to substantial compression. The intermediate layer undergoes a controlled amount of permanent compression by being compacted so that the residual elasticity thereof exerts a selected amount of compressive stress on the pyrolytic graphite.

The inner surface of the intermediate layer may be made hard and smooth to enhance deposition of the pyrolytic graphite thereon by use of any one of a number of techniques including infiltration, seal coating and resin coating and pyrolyzing. In most instances it is desirable to provide the intermediate layer with an outer diameter smaller than the inner diameter of the outer base by an amount which allows for shrinkage of the base relative to the intermediate layer by a selected amount before compression of the intermediate layer begins.

BRIEF DESCRIPTION OF THE DRAWINGS

The foregoing and other objects, features and advantages of the invention will be apparent from the following more particular description of preferred embodiments of the invention, as illustrated in the accompanying drawings, in which:

FIG. 1 is a perspective view of a throat insert of the type contemplated by the invention;

FIG. 2 is a sectional view of the throat insert of FIG. 1 taken along the line 2—2 thereof;

FIG. 3 is an end view of the throat insert of FIG. 1 illustrating one type of prior art construction for such articles;

FIG. 4 is a perspective view of a portion of the pyrolytic graphite layer in the throat insert of FIG. 1 useful in illustrating the properties of such material;

FIG. 5 is an end view of the throat insert of FIG. 1 showing still another type of prior art construction of such articles;

FIG. 6 is an end view of the throat insert of FIG. 1 showing a preferred construction in accordance with the invention;

FIG. 7 is a sectional view of the throat insert of FIG. 6 taken along the line 7—7 thereof;

FIG. 8 is a perspective view of the intermediate layer of the FIG. 5 arrangement;

FIG. 9 is a diagrammatic plot of stress with respect to strain useful in describing the behavior of the intermediate layer within the article of FIG. 6;

FIG. 10 is an end view of a portion of the throat insert of FIG. 1 prior to deposition of the pyrolytic graphite layer illustrating an optional feature in accordance with the invention;

FIG. 11 is a block diagram of the successive steps employed in one preferred method of making a laminated article according to the invention; and FIGS. 12, 13 and 14 are sectional views of three different embodiments of throat inserts according to the invention.

DETAILED DESCRIPTION

FIGS. 1 and 2 show a laminated article or throat insert 10 which is comprised of an outer substrate 12 of hollow, circular configuration and having a thickness which increases from a minimum at the opposite ends to a maximum at a region intermediate the opposite ends. An inner layer of pyrolytic graphite 14 is of hollow, circular configuration and of generally uniform thickness. The layer of pyrolytic graphite 14 is made smaller than the substrate 12 so as to fit within the substrate 12 in mating, concentric fashion.

When used as a throat insert or similar component for a rocket motor, the laminated article 10 has the pyrolytic graphite layer 14 thereof subjected to very high temperatures such as by exposure to the flame resulting from combustion within the rocket motor. The pyrolytic graphite layer 14 insulates surrounding structure from the flame as well as providing an ablative effect typically desired in such installations. The substrate 12 which is formed of relatively hard carbonaceous material such as graphite serves as a base for the pyrolytic graphite 14. The substrate 12 supports the otherwise brittle and fragile pyrolytic graphite 14 as well as providing insulation and being capable of withstanding the less extreme but nevertheless severe conditions which result from close proximity to the combustion flame.

FIG. 3 illustrates a basic prior art approach in which the substrate 12 is comprised of a unitary material 16. During deposition of the pyrolytic graphite 14 on the inner surface of the substrate 16, the substrate 16 undergoes substantial expansion due to the relatively high temperatures used for the pyrolytic graphite deposition process. When deposition of the pyrolytic graphite 14 is completed and the article is allowed to cool, the substrate 16 which is comprised of hard carbonaceous material such as graphite typically undergoes substantially greater contraction than the pyrolytic graphite 14 due to substantial differences in their temperature coefficients of expansion among other things. As a result the layer of pyrolytic graphite 14 and the substrate 16 exert substantial forces on one another as represented by the opposing arrows 18 at the interface between the two different materials.

As shown in FIG. 4 the pyrolytic graphite 14 is anisotropic in nature and itself resembles a laminate. Because of this anisotropic characteristic the pyrolytic graphite has strengths in different directions which vary substantially. Thus whereas the tensile strength in directions generally normal to the laminations of the part as represented by an arrow 20 may be on the order of 500 psi, the tensile strength in directions generally parallel to the laminations such as shown by arrows 22 and 24 may be on the order of 25,000psi. A further peculiarity of the pyrolytic graphite layer is in the nature of the shrinkage thereof during cooldown. Again because of the anisotropic nature of the material, the shrinkage in the direction generally normal to the laminations is typically about 12 times greater than the shrinkage in directions generally parallel to the laminations. The result is a substantial tendency on the part of the pyrolytic graphite layer to warp and eventually break up or otherwise fail if not properly supported by the substrate.

The alternative prior art approach shown in FIG. 5 involves deposition of a composite layer 26 on a carbonaceous base layer 28. The layer 26 comprises varying mixtures of pyrolytic graphite and relatively rigid carbonaceous material such as silicon carbide chosen for its strength and for its temperature coefficient of expansion. The layer 26 is produced by codeposition of the silicon carbide and pyrolytic graphite in desired proportions decreasing from essentially pure silicon carbide at the surface of the layer 26 in contact with the base layer 28 to essentially pure pyrolytic graphite at the opposite inner surface of the layer 26. The silicon carbide has a coefficient of thermal expansion which is very similar to that of the carbonaceous base 28. As the variation in silicon carbide content provides a means of minimizing the abrupt charges of coefficient of expansion, this approach is used to diffuse the interface stresses between the pyrolytic graphite and the base layer 28.

Laminated articles according to FIG. 3 experience a relatively high failure rate because of the substantial stresses between the pyrolytic graphite 14 and the substrate 16. In some instances the substrate 16 remains generally unaffected, while the layer of pyrolytic graphite 14 delaminates or otherwise fails during use of the article. In still other instances the substrate 16 may experience a series of generally radial cracks through portions thereof upon cooldown from the pyrolytic graphite deposition. This usually results in failure of the pyrolytic graphite layer 14 during subsequent use of the article.

As previously noted constructions of the type shown in FIG. 5 require careful fabrication for matching with both the pyrolytic graphite 14 and the base 28. This usually necessitates costly experimentation. Moreover, even assuming that an apparently compatible material is found, the article may still fail or otherwise not perform up to standards for various reasons. Thus while the silicon carbide or other rigid material tends to diffuse the total stresses on the pyrolytic graphite 14 and the base 28, the total reduction may not be very significant due to the hard and rigid materials which must be used.

As seen in FIG. 6 laminated articles according to the invention utilize an intermediate layer 30 of carbonaceous material of controlled compressive strength between the inner layer of pyrolytic graphite 32 and the outer layer defining a carbonaceous base 34. The material of the intermediate layer 30 is chosen generally without regard for its temperature expansion and contraction characteristics. Instead the material of the intermediate layer 30 is picked to have a desired compressive strength so that it will yield in response to the opposing stresses between the pyrolytic graphite 32 and the base 34 and at the same time exert a nominal amount of compressive stress on the pyrolytic graphite layer 32.

As seen in FIGS. 7 and 8 the intermediate layer 30 is of hollow, circular configuration and has a thickness which increases from a minimum at the opposite ends to a maximum at region intermediate the opposite ends. The inner surface 36 of the intermediate layer 30 must be capable of receiving and supporting the layer of pyrolytic graphite 32. Since most materials suitable for use as the intermediate layer 30 are porous in nature, it is generally desirable to treat the layer 30 so as to provide a surface 36 which is relatively hard and smooth. As described hereafter this may be done using a number of processes including infiltration, seal coating and resin coating.

FIG. 9 shows a stress-strain curve 38 applicable to the intermediate layer 30. The results may be contrasted with a stress-strain curve 40 pertaining to the prior art embodiments of FIGS. 3 and 5. It will be observed from the curve 38 that both stress and strain increase over the initial part of the curve. Thereafter, however, the increase in stress tends to level off and then actually decrease slightly as the strain continues to increase. Thereafter the stress increases relatively gradually with increasing strain. During the initial part of the curve 38 the intermediate layer 30 undergoes a slight amount of compression. The portion of the curve 38 which levels off and slightly reverses is apparently due to increasing compression of the layer 30 accompanied by some compaction or permanent deformation thereof. As the strain continues to increase the layer 30 continues to undergo compression with some accompanying permanent compaction, resulting in relatively slight increases in the stress.

Neither of the prior art arrangements of FIGS. 3 and 5 use a compressible material. As a result stress increases generally linearly with strain as shown by the curve 40 of FIG. 7. Because the strain may easily reach relatively high levels, the resulting stress increases rapidly, resulting in frequent failure of such articles.

Accordingly the intermediate layer 30 and the base 34 according to the invention combine to form a composite substrate which has the desirable features of both high strength and high compressibility for supporting the pyrolytic graphite 32. In addition to undergoing a determinable amount of permanent deformation, the intermediate layer 30 retains a sufficient amount of elasticity so as to exert a nominal amount of stress on the layer of pyrolytic graphite 32. This nominal stress is necessary to prevent the pyrolytic graphite 32 from cracking or delaminating. Otherwise warpage and eventual failure might result because of the substantially greater shrinkage in the direction 20 than in the directions 22 and 24.

The carbonaceous base 34 is comprised of a relatively strong and hard material such as a fine grained, moderate strength graphite. An example of such material is that sold under the grade designation ATJ by Union Carbide and Carbon Company. Alternatively composite materials such as those comprising carbon or graphite cloth combined with a matrix of carbon or graphite may be used. Examples of such materials include materials sold under the trademark "PYROCARB" by HITCO. The base 28 may be initially constructed in a hollow cylindrical configuration, or solid cylinders may be first formed, after which the cylinders are machined out to form the hollow interiors.

The intermediate layer 30 preferably comprises a carbonaceous material having desired compressibility and elasticity. Porous carbon has been found to be very suitable for such applications. Specific examples of suitable porous carbons include the material sold as Grade 45 by Union Carbide and Carbon Company. Similar materials designated Grade 30 and Grade 60 are also generally acceptable. Other low density carbonaceous materials such as the material sold under the trademark "PYROLARYX" by HITCO may be suitable for certain applications, although the latter material tends to be a little too rigid for some applications.

The embodiment of FIG. 10 is the same as that of FIG. 6 except that a stand-off 42 is provided between the base 34 and the intermediate layer 30 prior to deposition of the pyrolytic graphite 32. The stand-off 42 which may be of any appropriate size and which is typically on the order of 30 mils for laminated articles having outside diameters in the range of several inches up to 9 or 10 inches allows the base 34 to shrink in size relative to the intermediate layer 30 upon cooldown after deposition of the pyrolytic graphite 32. If a proper amount of stand-off is used the base 34 will contract onto the outside of the intermediate layer 30 just enough to maintain a reasonably snug fit therebetween and without build-up of substantial compressive stresses therebetween. As seen in FIG. 7 the stand-off 42 has the effect of moving the curve 38 to the position shown by the dotted line 44. Since the stand-off 42 only exists prior to deposition of the pyrolytic graphite 32, the arrangement of FIG. 10 will look like that of FIG. 6 in end view upon deposition of the pyrolytic graphite 32 and subsequent cooldown.

The successive steps of a preferred method of making the laminated article in accordance with the invention are shown in FIG. 11. Initially the base 34 is formed using the materials previously described and machining where necessary. The intermediate layer 30 is formed using similar techniques as well as the materials previously described. Next the intermediate layer 30 is preferably provided with a hard and smooth surface 36. Finally the base 34 and the intermediate layer 30 are heated to an appropriate temperature range, the layer of pyrolytic graphite 32 is deposited, and the article is permitted to cool.

One technique for improving the surface 36 of the intermediate layer 30 employs infiltration. The layer 30 is heated in the presence of a hydrocarbon gas such as methane to a temperature range of about 1700–2000°F. This results in some deposition of carbon in the pores and on the surface of the layer 30. While this technique is generally suitable for many applications, there are some situations in which the deposited carbon is not confined to the surface 36 but extends through part or all of the thickness of the intermediate layer 30. This is particularly true at relatively low infiltration temperatures.

If deposition of carbon through a substantial portion of the thickness of the intermedite layer 30 is a problem, an alternative is to use seal coating. In seal coating the intermediate layer 30 is heated in the presence of a hydrocarbon gas to a temperature of about 2500°F. This results in the deposition of pyrolytic carbon on the surface 36. The pyrolytic carbon is principally confined to the surface 36, and a substantial portion of the layer 30 retains its porosity and thereby its desirable compressive and elastic properties.

A still further alternative to infiltration and seal coating is to treat the surface 36 by applying and curing a resin. The resin is applied to the surface 36 by any appropriate technique such as brushing, following which the intermediate layer 30 is heated to a temperature range of about 1000–1400°F. to pyrolyze the resin. Thereafter the pyrolyzed resin is finished to provide a smooth surface such as by sanding with sandpaper. The resin used should have a relatively high char yield. For this reason furfural alcohol resins and those phenolic resins having a relatively high char yield are suitable.

In certain situations the resin may be too thin to fill the pores of the intermediate layer 30. In such situations graphite powder may be mixed with the resin until the resin has a proper consistency such that it may be brushed or trowelled onto the surface 36. Thereafter the part is heated to a temperature sufficient to pyrolyze the resin, and the resulting surface is finished, as described above.

With the surface 36 of the intermediate layer 30 prepared, the layer 30 is inserted within the base 34, and the pyrolytic graphite layer 32 is formed on the surface 36 using appropriate conventional techniques for the deposition of pyrolytic graphite. Typically the base 34 and the intermediate layer 30 are heated to a temperature range of about 3600-4200°F. in the presence of decreased pressure and in an atmosphere of natural gas, methane or other hydrocarbon gases. The pressure used is typically in the range of about 0.1-6.0 Torr. If pyrolytic graphite of the continuously nucleated type is desired conditions are maintained the same except that the pressure is increased to a range of about 8-20 Torr.

The thicknesses of the various parts 30, 32 and 34 are variable within ranges which depend on a number of factors. However the net result is that for a laminated article of given size a substantially greater thickness of pyrolytic graphite can be used as compared with prior art structures such as of the type shown in FIGS. 2 and 4. Thus the thickness of the pyrolytic graphite may range from about 60 thousandth of an inch in a relatively small article having a diameter on the order of 1½ inches to a value of about three-tenths of an inch in an article having a diameter of about 7 inches. Of course greater thicknesses are possible in certain situations and in cases of articles of greater size. The base 34 has a thickness which may range from about one-quarter inch in the case of relatively small parts to about 1 inch in the case of the larger parts. The thickness depends in part on the required strength of the base 34. The porous carbonaceous material comprising the intermediate layer 30 has a thickness which depends on a number of factors including the required compressibility and elasticity for a given application. Satisfactory results have been achieved with thicknesses on the order of one-quarter inch for relatively small articles having a diameter of a few inches up to a thickness of about one-half inch for larger articles having a diameter of about 8 or 10 inches.

FIGS. 12-14 provide examples of certain alternative configurations which are highly useful in rocket motor applications. In each case the direction of flow of the flames and hot combustion gases is indicated. Also the length of the articles are shown in greatly reduced fashion relative to the cross-sectional dimensions for ease of illustration.

In the embodiment of FIG. 12 the base 34 is partially conical in shape and has a uniform thickness along the length thereof. The intermediate layer 30 has a thickness which increases slightly and then decreases substantially along the length thereof in the direction of flow. The layer of pyrolytic graphite 32 has a substantially uniform thickness along the length thereof and a diameter which decreases to a minimum and then increases slightly, in the direction of flow.

In the embodiment of FIG. 13 the base 34 extends inwardly at one end thereof to define an annular lip or flange 46. The intermediate layer 30 is configured so as to form-fit over the flange 46 as well to provide the required stand-off from the inside surface of the base 34. Again the layer of pyrolytic graphite 32 has a substantially uniform thickness along the length thereof and a diameter which decreases to a minimum and then slightly increases in the direction of flow.

In the embodiment of FIG. 14 and the base 34 is cylindrical in shape and of uniform thickness. The intermediate layer 30 has a thickness which increases gradually and then decreases sharply in the direction of flow. The layer of pyrolytic graphite 32 is of uniform thickness.

Specific examples of articles made according to the invention are as follows:

EXAMPLE I

A base having an outside diameter of 10.005 inches, an inside diameter of 8.005 inches and a length of 4.25 inches was made from Grade ATJ graphite. An intermediate layer having an outside diameter of 8.003 inches at opposite end flanges, an outside diameter of 7.945 inches intermediate the end flanges and an inside diameter of 7.33 inches was fabricated of Grade 45 porous carbon. With the intermediate layer inserted within the base, a stand-off of 0.030 inches was provided. Next the inside surface of the intermediate layer of porous carbon was prepared by coating with a mixture of powdered graphite and furfural alcohol based resin. The coated porous carbon layer was then heated to about 1400°F in an inert atmosphere to pyrolyze the resin. After cooldown to room temperature, the pyrolyzed resin surface was polished with 400 grit silicon carbide paper, cleaned with compressed air and wiped with a clean, solvent-moistened soft cloth. Following that the base and the intermediate layer were heated to a temperature of 4000°F at a pressure of 10 Torr. in the presence of methane gas, and pyrolytic graphite was deposited to a thickness of 0.3 inches. Upon cooldown to room temperature no cracks or other imperfections occurred. The outside diameter of the graphite base had increased to 10.020 inches, and the inside diameter of the porous carbon intermediate ring which was also the outside diameter of the deposited pyrolytic graphite had increased to 7.55 inches.

EXAMPLE II

A base having an outside diameter of 5.0 inches, an inside diameter of 4.0 inches and a length of 2.25 inches was made from Grade CS graphite. An intermediate layer having an outside diameter of 3.94 inches and a contoured inside diameter as in FIG. 14 was fabricated from Grade 45 porous carbon. The inside diameter of the intermediate layer varied from 3.1 inches at one end through 1.8 inches at the "throat" a smallest cross section to 2.6 inches at the other end. When the intermediate layer was inserted within the base, a stand-off of 0.030 inches was provided. The inside surface of the intermediate layer of porous carbon was prepared by coating with a mixture of powdered graphite and furfural alcohol based resin. The coated porous carbon layer was then heated to about 1400°F in an inert atmosphere to pyrolyze the resin. After cooldown to room temperature, the pyrolyzed resin surface was polished with 400 grit silicon carbide paper, cleaned with compressed air and wiped with a clean, solvent-moistened cloth. Following that, the base and intermediate layer were heated to a temperature of 4000°F at a pressure of 10 Torr. in the presence of a methane and nitrogen gas mixture and pyrolytic graphite was deposited to a thickness of 0.065 inches. Upon cooldown to room temperature, no cracks, delamination or other defects occurred.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A laminate of generally carbonaceous composition comprising:
    a first member of relatively strong carbonaceous material having a hollow interior;
    a second member of compactible carbonaceous material having a selected compressibility which is substantially greater than the compressibility of the first member, the second member having a hollow interior defined by an inner surface thereof and being disposed within the hollow interior of and in contact with the first member, the second member combining with the first member to form a composite substrate; and
    a third member of pyrolytic graphite deposited on the inner surface of the second member;
    said second member being capable of undergoing substantial, controllable compaction in response to stress between the third member and the substrate.

2. The invention defined in claim 1, wherein the second member is at least partly compacted between the first member and the third member and at the same time exerts a controlled amount of stress on the third member.

3. The invention defined in claim 1, wherein the material of the second member is different from the material of the first member and the pyrolytic graphite of the third member.

4. The invention defined in claim 1, wherein the first member is comprised of fine grained, moderate strength graphite and the second member is substantially comprised of porous carbon.

5. A laminated article of hollow, circular configuration comprising the combination of:
    an outer layer of relatively strong and substantially noncompressible carbonaceous material forming a base;
    an intermediate layer of relatively weak and substantially compressible carbonaceous material disposed within and combining with the base to form a substrate; and
    an inner layer of pyrolytic graphite deposited on an inner surface of the intermediate layer opposite the base, the inner layer being highly noncompressible relative to the intermediate layer;
    said intermediate layer being compressed by a selected amount so as to substantially reduce stresses between the base and the layer of pyrolytic graphite to a desired level.

* * * * *